United States Patent [19]

Morin

[11] Patent Number: 5,414,955
[45] Date of Patent: May 16, 1995

[54] HAND HELD SEEDER

[76] Inventor: Thomas M. Morin, 182 W. Mountain Rd., Adams, Mass. 01220

[21] Appl. No.: 285,080

[22] Filed: Aug. 3, 1994

[51] Int. Cl.⁶ .................................................. A01C 1/00
[52] U.S. Cl. ........................................ 47/1.01; 47/901; 294/64.1; 414/737
[58] Field of Search ............... 414/737, 736, 752; 294/64.1; 47/1 A, 901

[56] References Cited

U.S. PATENT DOCUMENTS

| | | | |
|---|---|---|---|
| 1,526,405 | 2/1925 | Williams | 294/64.1 |
| 3,865,420 | 2/1975 | Warren | 294/64.1 |
| 4,046,285 | 9/1977 | Wendt | 111/200 |
| 4,466,554 | 8/1984 | Hanacek | 47/901 |
| 4,703,704 | 11/1987 | Mielke | 47/901 |
| 4,770,454 | 9/1988 | Mascher | 294/64.1 |
| 4,926,583 | 5/1990 | Hamilton | 47/901 |

FOREIGN PATENT DOCUMENTS 5336807 12/1993 Japan ......................... 47/901

*Primary Examiner*—Henry E. Raduazo

[57] ABSTRACT

A wand with a plurality of ports is provided with vacuum and vibration and with controls therefor. Seeds are drawn to the ports by the vacuum and are singulated by a seed covering a single port. The singulated seeds are each deposited in one of a plurality of plug trays by release of the vacuum and assisted by the vibration of the wand.

7 Claims, 1 Drawing Sheet

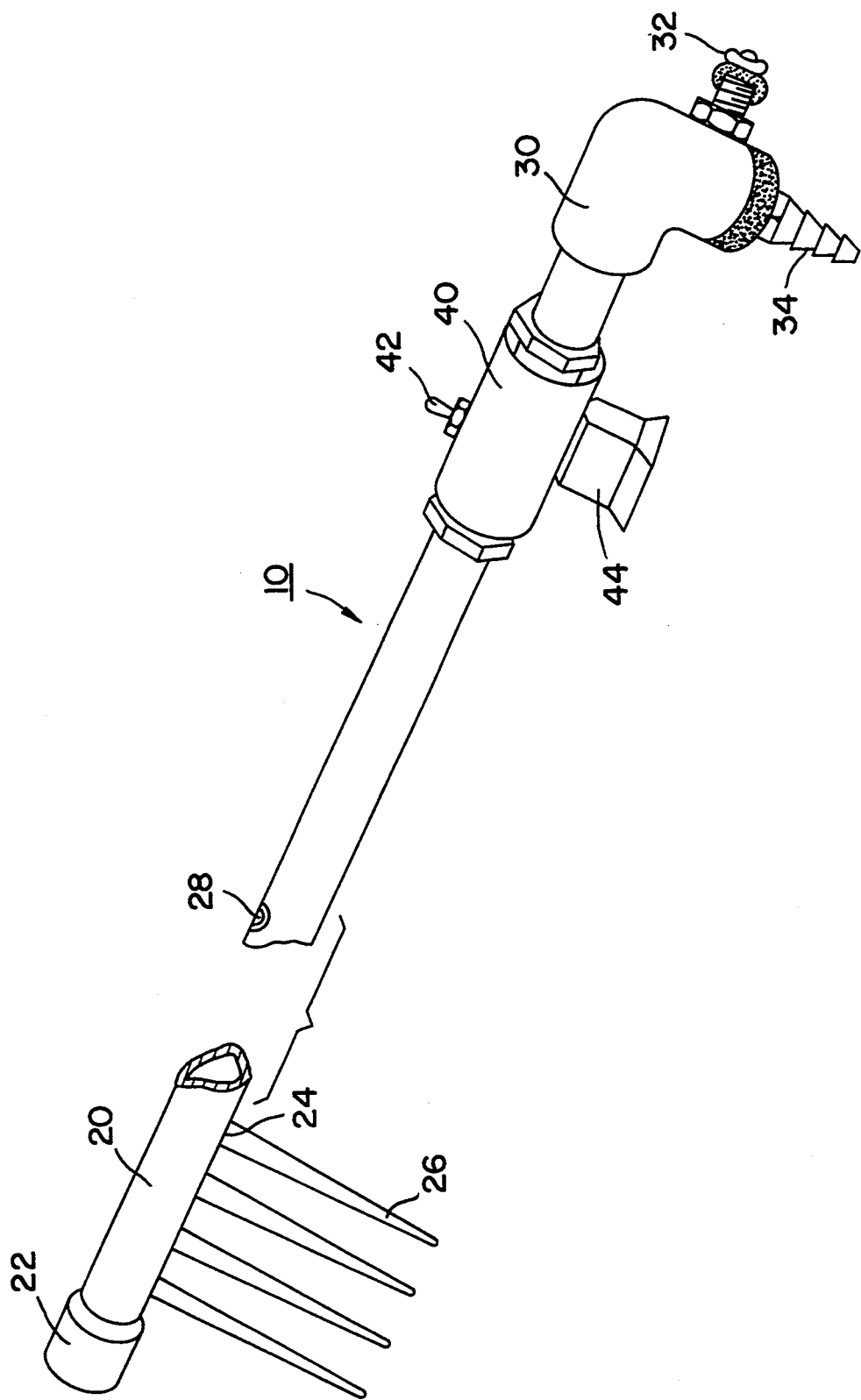

HAND HELD SEEDER

BACKGROUND OF THE INVENTION

This invention relates to a hand held seeder for singulating and dispensing seeds. More particularly, this invention relates to a hand held seeder for simultaneously delivering a plurality of seeds from a storage bin into a plurality of plug trays so as to deposit a single seed into a single tray.

Prior art devices for dispensing seeds into plug trays have involved complex mechanisms for singulating the seeds and thereafter dropping the seeds into the trays. For example, the rotating drum of Hamilton in U.S. Pat. No. 5,048,226 and the sliding plates of Hanacek et al in U.S. Pat. No. 4,466,554 disclose singulating devices that are costly to produce and difficult to control.

It is an object of this invention to provide a hand held seeder to dispense single seeds into each of an array of plug trays. Another object is to provide a light weight seeder in which pick-up and release controls permit single handed operation of the seeder. Another object is to provide a hand held seeder to dispense seeds into at least one complete row of plug trays.

SUMMARY OF THE INVENTION

In accordance with this invention a hand held seeder utilizes vacuum and vibration to pick up a plurality of individual seeds from a hopper or bin and release the singulated seeds into individual plug or seedling trays.

The seeder of this invention has a wand of rigid tubing which is sealed at one end and provided with a vacuum at the other end. The wand has a series of aligned ports which preferably are fitted with replaceable dispensing tips having a suitable inner bore for the size of seed to be planted. A vibrator is mounted on the wand, preferably at the vacuum end of the wand.

Seed in a bin is singulated and thereafter dispensed by dipping the wand into the seed bin while pulling a vacuum and applying vibration on the wand. A seed is attracted by the vacuum to an open port on the wand, and any additional seed at a port is displaced by the vibration. When all the ports are closed by seeds, the wand is moved to overlie the array of plug trays. The vacuum is then opened causing the seeds to fall into the trays. The dropping of the seeds is ensured by the vibration on the wand.

BRIEF DESCRIPTION OF THE DRAWING

The single FIGURE is a perspective of the hand held seeder of this invention. The wand is shown as broken to indicate that the number of ports and dispensing tips is not limited to the four shown.

DESCRIPTION OF THE PREFERRED EMBODIMENTS

The hand held seeder of this invention employs a wand 10 which includes a tube 20 that is sealed at one end by a closure member 22. Tube 20 has a plurality of ports 24 which are provided with hallow dispensing tips 26. A control hole 28 is located on tube 20 beyond the line of ports 24 so as to permit opening or closing a vacuum drawn through tube 20 to ports 24.

Wand 10 is closed off at its end opposite member 22 by a vacuum fitting 30 which has an air valve 32 to regulate the vacuum being pulled through ports 24 and tube 20 from a conventional vacuum pump (not shown) connected to inlet 34. Valve 32 is used to control the amount of air permitted to enter the vacuum line so as to accomodate the handling of seeds of various weights.

Wand 10 also is provided with a commercial vibrator 40 which is powered by a 9 volt battery positioned in battery clip 44 and controlled by an on/off switch 42. Vibrator 40 that is shown in this drawing has a through passage to permit vacuum to be pulled through the vibrator. However, a vibrator mounted atop tube 20 without access to the vacuum passage has been found to produce the desired vibration of tube 20.

The number of tips 26 in tube 20 is determined by the number of plug trays in a given direction in a plug array. Changing from seeding in one commercial array to an array with more or fewer plugs is facilitated by having a set of replaceable tubes 20 having the number of tips needed for each particular tray array. Tube 20 is friction fitted into vibrator 40, or a separate fitting, for easy change from one set of tubes and tips to another.

The materials used for wand 10 are relatively unimportant. It has been found that an all plastic assembly is both economical and advantageous in ease of assembly. In the best mode as presently employed, tube 20 is rigid walled PVC having a inner bore of one-half inch.

Tips 26 are flexible to provide self-adjustment to varying heights of seed in a storage bin, and are transparent or translucent to permit visual location of broken seed or dirt blocking any tip 26.

A commercial vacuum pump that pulls 29 mm of mercury capacity is more than enough to lift a full wand of large seeds in an array of 18 tips. Air valve 32 can be adjusted to determine the amount of vacuum that is permitted to escape when lifting tiny flower seeds.

The vibrator 40 housing and the vacuum fitting 30 are also rigid PVC so as to facilitate friction fitting of the members 20, 30 and 40.

Should environmental conditions create a static charge in wand 10 a grounding wire can be run from the wand to the vacuum pump, preferably through the vacuum hose.

Operation of the hand held seeder of this invention is very simple and permits an operator to become skilled in a short time. The three major components of tube 20, vibrator 40 and vacuum fitting 30 are assembled as shown in the drawing. With the pump pulling a vacuum and the vibrator 40 operating, the operator closes off control hole 28 with his/her thumb or finger so that the vacuum is drawn solely through tips 26. Wand 10 is then carried over a seed bin of such dimension as to accomodate all tips 26 at a single dipping into the seed bin. The tips are brought into contact with the seeds which are drawn by the vacuum to close off the passageways in the tips. Vibrator 40 serves to shake off any seed that is not being held in sealing relation to a tip.

The loaded wand 10 is then moved to a position wherein each tip 26 overlies a ping. The operator then releases the vacuum by opening control hole 28 to let each seed drop into its plug. The vibrator 40 coacts with the loss of vacuum to ensure that the seeds drop off the wand 10.

What is claimed is:

1. A hand held device for delivering a plurality of single seeds from a storage bin to a plurality of single plug trays, said device comprising,
   a wand having a plurality of ports, means for pulling a vacuum through said ports, means for vibrating said wand, said vacuum means and said vibrating means so constructed and arranged that a single seed covers off a single of said ports, and control means for relieving said vacuum means to permit seeds to drop from said ports.

2. The device of claim 1 wherein said wand is a hollow tube closed at one end and connected to said vacuum means adjacent the other end of said wand.

3. The device of claim 2 wherein said ports are at least one row of spaced openings in said wand extending in alignment from adjacent said closed end toward said control means.

4. The device of claim 3 wherein said vibrating means is mounted on said wand adjacent said vacuum means end of said wand.

5. The device of claim 3 wherein said control means is located in said wand between said ports and said vacuum means end of said wand.

6. The device of claim 3 wherein said ports have a dispensing tip extending outwardly a uniform length from each of said spaced openings.

7. The device of claim 6 wherein said dispensing tip is flexible to accomodate variations in reach from said wand to seeds in a storage bin.

* * * * *